United States Patent [19]

John

[11] Patent Number: 4,966,076
[45] Date of Patent: Oct. 30, 1990

[54] SYSTEM FOR RELEASABLY COUPLING A STUB SHAFT EXTENDING FROM A PRINTING CYLINDER TO A SHAFT PASSING THROUGH A MACHINE SIDE WALL

[75] Inventor: Thomas John, Augsburg, Fed. Rep. of Germany

[73] Assignee: MAN Roland Druckmaschinen AG, Offenbach am Main, Fed. Rep. of Germany

[21] Appl. No.: 430,516

[22] Filed: Nov. 1, 1989

[30] Foreign Application Priority Data

Nov. 5, 1988 [DE] Fed. Rep. of Germany ....... 3837625

[51] Int. Cl.$^5$ .............................................. B41F 3/46
[52] U.S. Cl. .................................... 101/216; 101/212; 403/312
[58] Field of Search ............... 101/216, 212, 232, 247, 101/348, 349; 29/116.1, 724, 148.4 A; 403/306, 312, 344; 464/97–99

[56] References Cited

U.S. PATENT DOCUMENTS

| | | | |
|---|---|---|---|
| 3,039,387 | 6/1962 | Zimmer et al. | 101/216 |
| 3,253,541 | 5/1966 | Goodrich | 101/247 |
| 4,499,831 | 2/1985 | Anastasio et al. | 101/248 |

Primary Examiner—Edgar S. Burr
Assistant Examiner—Joseph R. Keating
Attorney, Agent, or Firm—Frishauf, Holtz, Goodman & Woodward

[57] ABSTRACT

To permit radial removal of a cylinder, roller or similar element in a printing machine from between the side walls (1) thereof, the cylinder or roller (9) is formed with two stub shafts (8) coupled by separable half-shells (5, 6) to the ends of shaft elements (3) passing through the side wall (1) of the printing machine. One of said shaft elements can be coupled to a drive gear (4). In accordance with the invention, and to permit rolling off of the stub shaft (8) of the cylinder over the half-shell, the separating surfaces (10, 11, 12, 13) between the half-shells are formed to extend essentially tangentially with respect to the part-circular clamping surfaces (14, 15) which clamp the stub shaft to the shafts (3) passing through the side wall, one of the half-shells being secured to the shaft elements. Preferably, a locating abutment or notch (17) is formed on the half-shell (6) secured to the machine shaft (3) to permit placement of a locating projection (18) on a roll-out rail (19) against the half shell so that, upon removal of the other half-shell (7), the cylinder can be rolled off on the rail after passing over the separating surface.

6 Claims, 1 Drawing Sheet

SYSTEM FOR RELEASABLY COUPLING A STUB SHAFT EXTENDING FROM A PRINTING CYLINDER TO A SHAFT PASSING THROUGH A MACHINE SIDE WALL

The present invention relates to printing machinery, and more particularly to a compact arrangement to couple a round stub shaft of a cylinder of a printing machine to a machine shaft passing through a side wall of a printing machine, for example through a bearing thereof, in which the stub shaft and the drive shaft can be disconnected from each other to permit the cylinder to be removed from the printing machine, for example by sliding it out radially from its position between two drive shafts, each one passing from opposite sides through opposite side walls of the machine.

BACKGROUND

It has previously been proposed to couple drive shafts and stub shafts of cylinders of a printing machine by clamping elements which include two separable parts, typically half-shells, separated by radially extending separating or break lines. The separable half shells can be clamped against each other and about the stub shaft. By removing one half shell, the stub shaft and the cylinder thereon can be removed from the printing machine, the other half-shell remaining secured to the drive shaft portion.

Printing machines having this type of coupling are in public uss, and sold by the assignee of the present application under the trade name "FLEXOMAN". The half-shell separating plane extends radially. To permit the cylinder clamped between the half-shells to be removed from the printing machine, a cylindrical extension is provided between the stub shaft and the cylinder jacket, having a diameter greater than the diameter of the stub shaft. A run-off rail is placed beneath the cylindrical projections in order to permit the cylinder to be rolled out from its position in the printing machine after the half-shell has been removed from the drive shaft. Such removal may be necessary for cleaning, reconditioning of the surface of the cylinder, or the like.

The cylindrical attachment or extension, which is necessary to permit roll-out of the cylinder on the roll-out rails, so that the cylindrical surface is not damaged thereby, requires additional space between the side walls of the printing machine.

THE INVENTION

It is an object to provide a coupling system which permits an increased length of cylinder between printing machines having a given side wall distance and/or to decrease the spacing between the cylinder and the side wall while still permitting removal of the cylinder from its clamped position in the printing machine.

Briefly, the cylinder can be rolled out on its stub shafts by repositioning the separating surfaces of the shells in such a way that at least one of the separating surfaces extends tangantially to the clamping surface of the half-shell about the stub shaft. Normally, both clamping surfaces of the half-shells which, usually, are essentially semi-circular, will extend tangentially about the stub shaft.

Basically, therefore, the system, by the simple means of repositiouing the clamping surfaces so that they extend essentially tangentially with respect to the stub shaft, permits elimination of the additional roll-out flange since, then, the roll-out rails can be engaged directly against the remaining half-shell on the drive shaft, and the cylinder removed by rolling on its stub shaft.

In accordance with a preferred feature of the invention, a positioning recess to locate the roll-out rail can be formed on the half shell coupled to the drive shaft.

DRAWINGS

FIG. 1 is a fragmentary sectional view through the side wall of a printing machine, showing a drive shaft element to which a stub shaft of an anilox roller is coupled; and FIG. 2 is a fragmentary view along the arrows II—II of FIG. 1.

DETAILED DESCRIPTION

Figure 1:
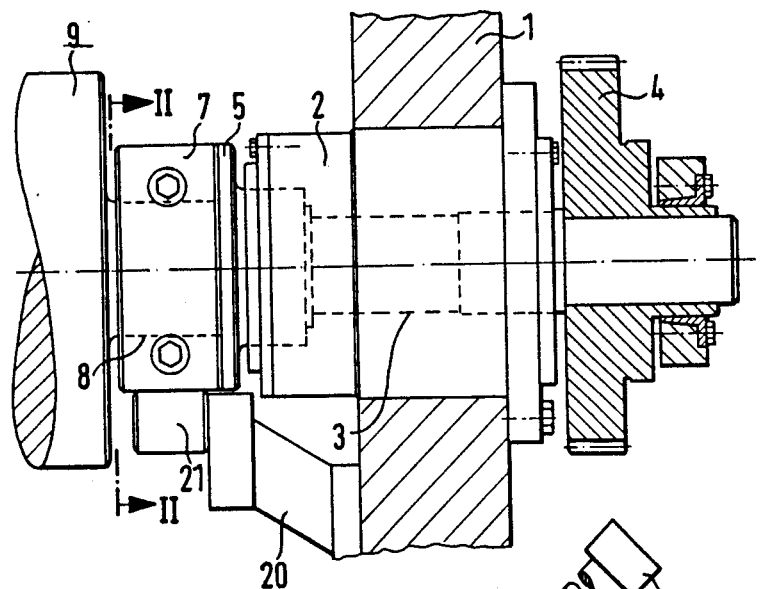
Figure 2:
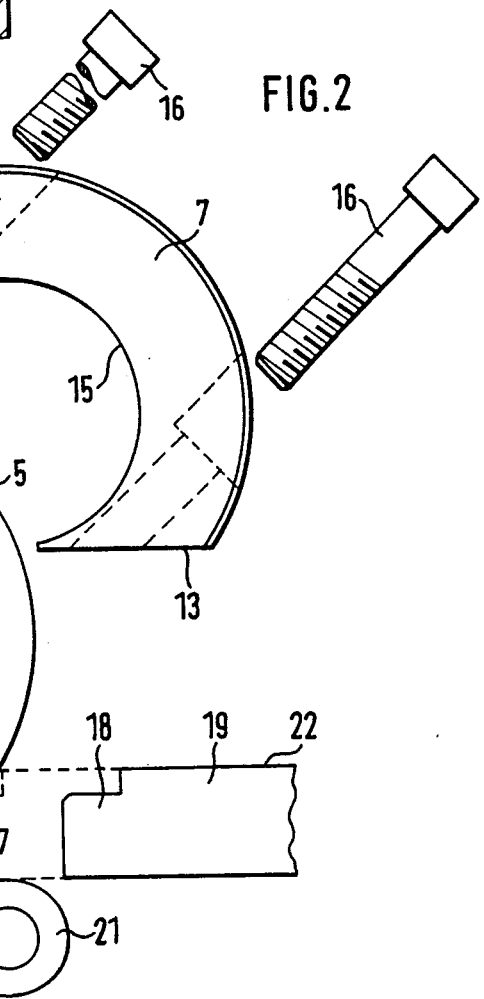

A side wall 1 of a printing machine has a bearing bushing 2 located therein, within which a drive or machine shaft 3 is rotatable. A drive gear 4 is secured to the drive shaft 3, located outside of the side wall 1 of the printing machine. The inner end of the drive shaft 3, that is, the end inwardly of the side wall 1, terminates in a flange 5. The flange 5 is securely coupled to a half-shell 6 which, together with another separable half-shell 7, can clamp a stub shaft 8 of a roller or a cylinder 9 within the printing machine, and provide for coupling of the machine or drive shaft to the stub shaft. The cylinder 9 may, for example, be an inking cylinder, a form cylinder or, for example, an anilox roller, or any cylinder of a printing machine.

Each one of the half-shells 6, 7 is separable from the other half-shell along two plane separating surfaces 10, 12, 11, 13, respectively. A part-circular clamping surface 14 is formed within the half-shell 6 and, similarly, a part-circular clamping surface 15 is formed between the separating surfaces 2, 13 of the half-shell 7.

In accordance with the present invention, the separating surface 11 of the half-shell 6, secured to the flange 5 terminates tangentially to the clamping surface 14 similarly, the separating surface 13 of the half-shell 7 is tangential to the clamping surface !5, and, of course, also to the clamping surface 14. Likewise, the separating surfaces 10, 12 are tangential, respectively to the clamping surfaces 14, 15. It is not necessary that the separating surfaces 10, 12 are tangertial to the clamping surfaces 14, 15, although preferred.

The removable half-shell 7 is secured to the half-shell 6 secured to flange 5 by suitable screws 16 to clamp the shaft 8 between the surfaces 14, 15.

In accordance with a feature of the invention, the half-shell 6 is formed with a recess or notch 17 beneath the separating surface 11. The notch 17 forms an engagement or abutment shoulder so that a suitably stepped end portion 18 of a roll-out rail 19 can be placed thereagainst. The roll-out rail 19 can :e supported and placed in position by a support roller 21, suitably secured to the side wall 1 by a bracket 20 (FIG. 1). The support roller 21 is preferred, although a slider or rail support may also be used.

Similar half-shell elements 6, 7 are provided at the other side wall of the printing machine, not shown, and are identical or, rather, mirror-image identical, in axial alignment with a machine shaft corresponding to machine shaft 3 and extending through the other side wall of the printing machine. Guide elements for a roll-out rail, likewise, are provided on the half-shell secured to the machine shaft passing through the side wall at the other side as well.

OPERATION

To remove the cylinder 9 from the printing machine, it is rotated until the separating surfaces 11 of the half-shells 6 are horizontal at both ends of the cylinder. The screws 16 can then be loosened and the half-shells 7 removed. The cylinder 9 can now be removed. This removal is facilitated by placing the run-out or roll-out rails 19 in position against the positioning notches or abutments or shoulders 17. The roll-out rails are placed against the half-shells 6 until the end 18 engage against the positioning abutment 17. The upper surfaces of the roll-out rails 19 will then match the position of the separating surface 11, and the cylinder 9 can be rolled out from between the side walls of the printing machine.

Various changes and modifications may be made within the scope of the inventive concept.

I claim:

1. In combination with a printing machine having
   a side wall (1);
   a cylinder or roller (9);
   a stub shaft (8) extending axially from the cylinder or roller; and
   a machine shaft (3) extending through said side wall (1) coaxial with said stub shaft 8,
   a system for releasably coupling the stub shaft (8) to the machine shaft (3) and to permit removal of the cylinder (9) radially outwardly from the side wall, comprising
   a clamping shell (6, 7) formed in two parts, wherein said two parts are separable from each other, one (6) of said parts being secured to the machine shaft (3) and the other part (7) being removable from said one part, said parts defining separating surfaces (10–13) and clamping surfaces (14, 15) extending about said stub shaft; and
   means (16) for attaching said parts together to clamp the stub shaft (8) between said parts,
   wherein, in accordance with the invention,
   at least one (11) of the separating surfaces of said one part (6) extends tangentially to the clamping surface (14) about the stub shaft of said one part (6).

2. The combination of claim 1, wherein said at least one separating surface (11) extends essentially tangentially with respect to the stub shaft (8).

3. The combination of claim 1, wherein both separating surfaces (10, 11) of said one part (6) extend essentially tangentially to the clamping surface about the stub shaft of said clamping surface.

4. The combination of claim 3, wherein both separating surfaces (10, of said one part (6) extend essentially tangentially with respect to the stub shaft (8).

5. The combination of claim 1, further including a positioning means (17) coupled to said one part (6) and indicating when said one part is in a predetermined rotary position.

6. The combination of claim 1, wherein said one part (6) is formed with a positioning abutment (17);
   a roll-out rail 19) is provided, said roll-out rail defining a top surface (22);
   and means (20, 21) coupled to the printing machine and supporting said roll-out rail for engagement with said abutment (17) and for positioning the top surface (22) of the roll-out rail in alignment with said at least one separating surface (11) to permit removal of said cylinder over said at least one separating surface (11) and the top surface (22) of said rail (19).

* * * * *